US011035668B2

(12) United States Patent
Gresch et al.

(10) Patent No.: US 11,035,668 B2
(45) Date of Patent: Jun. 15, 2021

(54) METHOD FOR DETERMINING A PHYSICAL PARAMETER OF AN UPPER LINK

(71) Applicant: DEERE & COMPANY, Moline, IL (US)

(72) Inventors: Valentin Gresch, Pfäffikon (CH); Florian Reinmuth, Sinsheim (DE)

(73) Assignee: DEERE & COMPANY, Moline, IL (US)

( * ) Notice: Subject to any disclaimer, the term of this patent is extended or adjusted under 35 U.S.C. 154(b) by 472 days.

(21) Appl. No.: 16/007,303

(22) Filed: Jun. 13, 2018

(65) Prior Publication Data

US 2018/0372490 A1   Dec. 27, 2018

(30) Foreign Application Priority Data

Jun. 22, 2017 (DE) .......................... 102017210532.1

(51) Int. Cl.
*G01B 21/22*    (2006.01)
*A01B 63/114*   (2006.01)
(Continued)

(52) U.S. Cl.
CPC ............ *G01B 21/22* (2013.01); *A01B 59/002* (2013.01); *A01B 59/004* (2013.01);
(Continued)

(58) Field of Classification Search
CPC ...... G01B 21/22; G01B 21/02; A01B 59/002; A01B 59/004; A01B 59/066;
(Continued)

(56) References Cited

U.S. PATENT DOCUMENTS 4,508,178 A  *  4/1985  Cowell ................ A01B 63/114
                                              172/239
5,472,056 A  *  12/1995  Orbach ............... A01B 63/1117
                                              172/2

(Continued)

FOREIGN PATENT DOCUMENTS

DE        19747949 A1    7/1983
DE        19747949 A1    5/1999
(Continued)

OTHER PUBLICATIONS

European Search Report issued in counterpart application No. 18172333.9 dated Nov. 21, 2018. (5 pages).

(Continued)

*Primary Examiner* — Regis J Betsch
*Assistant Examiner* — Kaleria Knox

(57) ABSTRACT

A method for determining a physical parameter of an adjustable upper link of a three-point hitch during a working operation thereof includes providing a lower link of the three-point hitch and an implement attachable to the upper and lower links of the three-point hitch. The method includes generating calibration data prior to the working operation of the three-point hitch, where the calibration data defines a relationship of a length of the upper link to an upper link angle defined between the upper link and a reference line. Moreover, the calibration data is used to determine a physical parameter of the adjustable upper link during the working operation.

18 Claims, 2 Drawing Sheets

(51) Int. Cl.
*A01B 59/06* (2006.01)
*A01B 59/00* (2006.01)
*A01B 76/00* (2006.01)
*G01B 21/02* (2006.01)

(52) U.S. Cl.
CPC .......... *A01B 59/066* (2013.01); *A01B 63/114* (2013.01); *A01B 76/00* (2013.01); *G01B 21/02* (2013.01); *A01B 59/068* (2013.01)

(58) Field of Classification Search
CPC ..... A01B 63/114; A01B 76/00; A01B 59/068; A01B 63/1117; E01C 19/4873
See application file for complete search history.

(56) References Cited

U.S. PATENT DOCUMENTS

| | | | |
|---|---|---|---|
| 6,218,737 B1 * | 4/2001 | Adamek | A01B 59/004 307/10.1 |
| 7,142,968 B2 | 11/2006 | Alexander et al. | |
| 10,524,403 B2 | 1/2020 | Gresch et al. | |
| 2011/0085859 A1 * | 4/2011 | Yost | E01C 19/4873 404/84.5 |

FOREIGN PATENT DOCUMENTS

| | | | | |
|---|---|---|---|---|
| DE | 10140383 A1 * | 3/2003 | ......... | A01B 63/1006 |
| DE | 10140383 A1 | 3/2003 | | |
| DE | 102016217944 A1 | 3/2018 | | |
| DE | 102016223189 A1 | 4/2018 | | |
| DE | 102017215588 A1 | 5/2018 | | |
| EP | 2947431 A1 | 11/2015 | | |
| EP | 3315926 A1 | 5/2018 | | |
| WO | 2016192973 A1 | 12/2016 | | |
| WO | WO-2016192973 A1 * | 12/2016 | ........... | A01B 69/008 |

OTHER PUBLICATIONS

German Search Report issued in counterpart application No. 102017210532.1 dated Apr. 26, 2018. (10 pages).

* cited by examiner

METHOD FOR DETERMINING A PHYSICAL PARAMETER OF AN UPPER LINK

RELATED APPLICATIONS

This application claims priority to German Patent Application Ser. No. 102017210532.1, filed Jun. 22, 2017, the disclosure of which is hereby incorporated by reference in its entirety.

FIELD OF THE DISCLOSURE

The present disclosure relates to a method with the features of the preamble of claim 1, for determining a physical parameter of an upper link.

BACKGROUND

A conventional tractor having a rear three-point hitch having an upper link and two lower links is known from DE 197 47 949 A1. An attached implement is mounted on the rear three-point hitch. It is intended that an optimal kinematics with respect to use is achieved for each attached implement by detecting an actual length setting of the upper link and comparing it to a target length setting. Depending on the comparison, the length setting of the upper link can be shortened or lengthened. In this process, a stored curve is used, which represents respective target length settings in relationship with associated lift settings.

There is a need of being able to determine a physical parameter of an adjustable upper link or three-point hitch during working deployment.

SUMMARY

In a first embodiment of the present disclosure, a physical parameter of an adjustable upper link for a three-point hitch is determined during working operation with an attached implement. The physical parameter is determined using calibration data generated prior to a working operation of the three-point hitch. The calibration data can consequently be generated in a calibration process prior to the working operation of the three-point hitch. The calibration is done in such a manner that the calibration data represents a relationship of a length of the upper link to an upper link angle. This provides a calibration diagram that is easily handled in terms of processing, representing an upper link length as a function of an upper link angle or vice versa.

The upper link angle is the angle included between the upper link (e.g., a central longitudinal axis of the upper link) and a reference line. For example, the earth horizontal line or a vehicle horizontal line of a vehicle or working machine supporting the three-point hitch can be used as the reference line. The vehicle horizontal line runs parallel to a travel direction of the vehicle.

The length of the upper link or the upper link angle can be adjusted during the working operation. Exact knowledge of this data for the upper link is relevant, for example, to being able to determine an actual working height of the attached implement and the orientation, in particular the tilting thereof relative to the mobile working machine supporting the three-point hitch. The above-mentioned calibration data makes it possible to forego technically elaborate and correspondingly cost-intensive measuring arrangements on the upper link or other positions on the three-point hitch or on the working machine for determining a position or location of a three-point hitch or an implement attached thereto during the working deployment. The calibration data offers a possibility for converting a length of the upper link to an upper link angle and vice versa. Depending on the application of the calibration data, it is therefore possible to save costs by eliminating, at least in part, measuring arrangements that are conventionally arranged on the three-point hitch or on the mobile working machine.

The physical parameter of the upper link determined according to the method can also be used as an input parameter or control parameter, e.g., in the determination of a weight force of an attached implement on the three-point hitch or in determining an axle load.

The mobile working machine is designed in particular as an agricultural vehicle such as a tractor or the like. The implement can be designed in different ways. For example, it can have a working function regarding the field to be cultivated, a transport function (e.g., a rear loader, a front loader, a bale fork or a silage block cutter) or a function as a counterweight.

A current upper link angle of the upper link is determined by means of a suitable measuring arrangement or sensor system during working operation. The current length of the upper link can be determined by using the calibration data. It is therefore possible to do without a complex and cost-intensive measuring arrangement (e.g., a sensor system or other components) for determining the current length of the upper link. Because such measuring arrangements are conventionally partially integrated into the upper link, the elimination of such a measuring arrangement also makes it possible to avoid any impairment of the length-adjusting range of the upper link.

In another embodiment, a direct measurement or sensor detection of the length of the upper link is carried out. In this case, the respective upper link angle can be determined without further components, sensors or the like. Proceeding from a directly measured upper link length, it is possible to use a corresponding upper link angle, without additional technical equipment, as an input or control parameter for different applications, e.g., determining a mass or weight force of an attached implement or determining an axle load of the mobile working machine.

It fundamentally makes sense to generate the calibration data as a function of defined adjustments of the three-point hitch, because the ratio between the length of the upper link and the angle of the upper link can be different depending on the geometrical adjustment of the three-point hitch. For different geometrical adjustments of the three-point hitch and a corresponding generation of different calibration data, at least one of the following features can be considered:

different articulation positions on the lower link for connecting a lifting strut (e.g. lifting spindle),
different connecting positions on the support structure of the working machine for connecting the upper link,
adjusted length of the lifting strut (e.g. lifting spindle),
different coupling points on the attached implement for coupling the upper link and the lower link or links, and thus different mast heights.

In particular, before or during the working operation of the three-point hitch, the geometrical adjustment thereof is checked in order to use the calibration data associated with this adjustment for determining the upper link length or the upper link angle. This geometrical adjustment is checked by capturing and processing sensor data (e.g., in a corresponding control device).

Calibration data for different possible mast heights is generated relative to a specific implement or relative to different implements. Before or during working operation, the previously generated and assigned calibration data can be recalled manually or automatically depending on the detected implement or depending on the detected mast height of the implement.

In another embodiment, calibration data is generated as a function of a defined lifting position of the lower link. The lifting position is defined in particular by an angle between the lower link and a reference line (e.g., a vehicle horizontal line or earth horizontal line).

Different lifting positions of the lower link typically result in different ratios between the upper link length and the upper link angle. It is therefore advantageous to generate calibration data for multiple, i.e., different, lifting positions. Depending on the detected lifting position during working operation, the calibration data associated with this lifting position can be automatically provided.

For example, calibration data is generated during the calibration process for a first lifting position (e.g., a minimum lifting position) and then for a second lifting position (e.g., a maximum lifting position). On the basis of the calibration data for these two lifting positions, calibration data for a plurality of lifting positions therebetween can be generated easily by means of interpolation, so that an entire characteristic diagram can be produced and made available with low calibration effort.

A working range for the displacements of the lower link during working operation is defined, ranging from a first or minimum lifting position to a second or maximum lifting position. As already mentioned, a characteristic diagram with calibration data for a plurality of different lifting positions can be generated for this entire working range with low calibration effort. In the interest of a low calibration effort, no further calibration data outside the defined working range is generated. For a technically simple performance of the method during working operation, it is therefore favorable to suppress the determination of a physical parameter of the upper link if a lifting position outside the working range is detected.

To generate calibration data, it is advantageous to keep the lower link in a defined lifting position with the implement attached and then to vary the upper link with respect to its length. In other words, the upper link is extended or retracted between a minimum upper link length and a maximum upper link length during the calibration. The minimum upper link length can be a smallest physically possible length or a defined smallest length of the upper link. Analogously, the maximum upper link length can be a largest physically possible length or a defined largest length of the upper link.

In order to generate complete calibration data, the upper link angle is detected during length variation of the upper link in the calibration.

To increase the accuracy of the calibration data, it is possible to move in both directions during the calibration of the upper link. Thus, the upper link can be first extended in the direction of a maximum upper link length, for example, and then retracted in the direction of a minimum upper link length.

To generate the calibration data with low effort, the upper link angle is detected in an embodiment during length variation of the upper link. Individual values of the upper link length achieved during the calibration can then be correlated with the respective detected upper link angle that has been detected (in particular by a sensor or by measurement). In particular, this correlation is a function of time, so that for a moving speed of the upper link assumed to be known, a value of the upper link length and a value of the upper link angle can be associated with each respective considered point in time. Calibration data or a calibration diagram can thereby be generated in a simple manner, without having to directly measure the length or variation in length of the upper link. This supports a cost-effective generation of the calibration data and a correspondingly cost-effective determination of the sought physical parameter of the upper link. The movement speed of the upper link is assumed to be known, for example, by assuming the movement of the upper link to be continuous (i.e., constant movement speed) or, particularly for non-constant movement speed, by empirical tests.

The calibration data is provided in the form of an easy-to-handle characteristic curve. A specific characteristic curve can be generated for a defined adjustment of the three-point hitch, e.g., a defined lifting position of the lower link during the calibration process.

It is further possible to define the upper link length on the basis of at least one of a change of the upper link angle over time or an adjusting direction of the upper link length.

The adjusting direction can be determined for a hydraulic upper link by the position of a control valve actuating the upper link, for example. The displacement direction provides information as to whether the upper link is being displaced in the direction of a larger or a smaller length. Taking into account the above-mentioned features enables an unambiguous determination of the upper link length with a low data processing effort even if the calibration data or the characteristic curve contains an inflection point (in particular a maximum upper link angle), while an identical value of the upper link angle is present on the characteristic curve on each side of the extreme value or inflection point. In this case, two values of the upper link length are possible for an upper link angle detected by sensor means. The value of the upper link length can be determined by evaluating a recorded plot of the upper link angle versus time and the determined displacement direction of the upper link.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
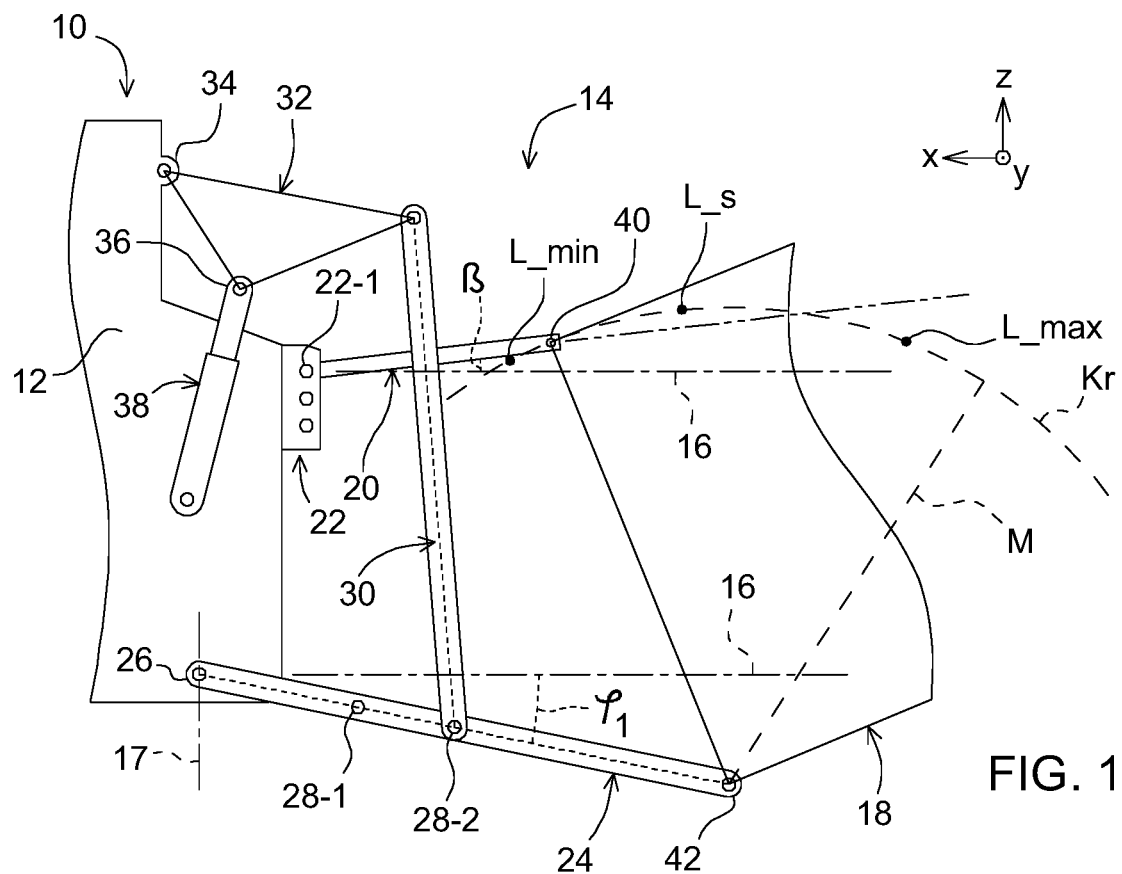
FIG. 1 is a side view of a three-point hitch with a lower link in a first lifting position.

FIG. 1 shows an agricultural vehicle 10, more particularly a tractor, having a supporting structure 12 (e.g., frame chassis, etc.) shown partially and schematically. A three-point hitch 14, shown schematically and not true to scale, is mounted on the supporting structure 12. A planar kinematics of the three-point hitch 14 spans a plane, which is designated as an x-z plane with reference to FIGS. 1 and 2. The x-direction here corresponds to a vehicle longitudinal direction or vehicle horizontal line 16, while the z-direction corresponds to a vehicle vertical direction or a vehicle vertical line 17. A y-direction arranged perpendicular to the x-direction and the z-direction corresponds to a vehicle transverse direction. A schematically shown implement 18 is mounted on the vehicle 10 by means of a three-point hitch 14.

The three-point hitch 14 includes an upper link 20 that is articulated to the supporting structure 12 of the tractor 10 via a connecting point 22. The connecting point 22 enables three different connecting positions for the upper link 20 along the vehicle vertical direction 17, wherein the connecting position 22-1 is used in the example.

Figure 2:
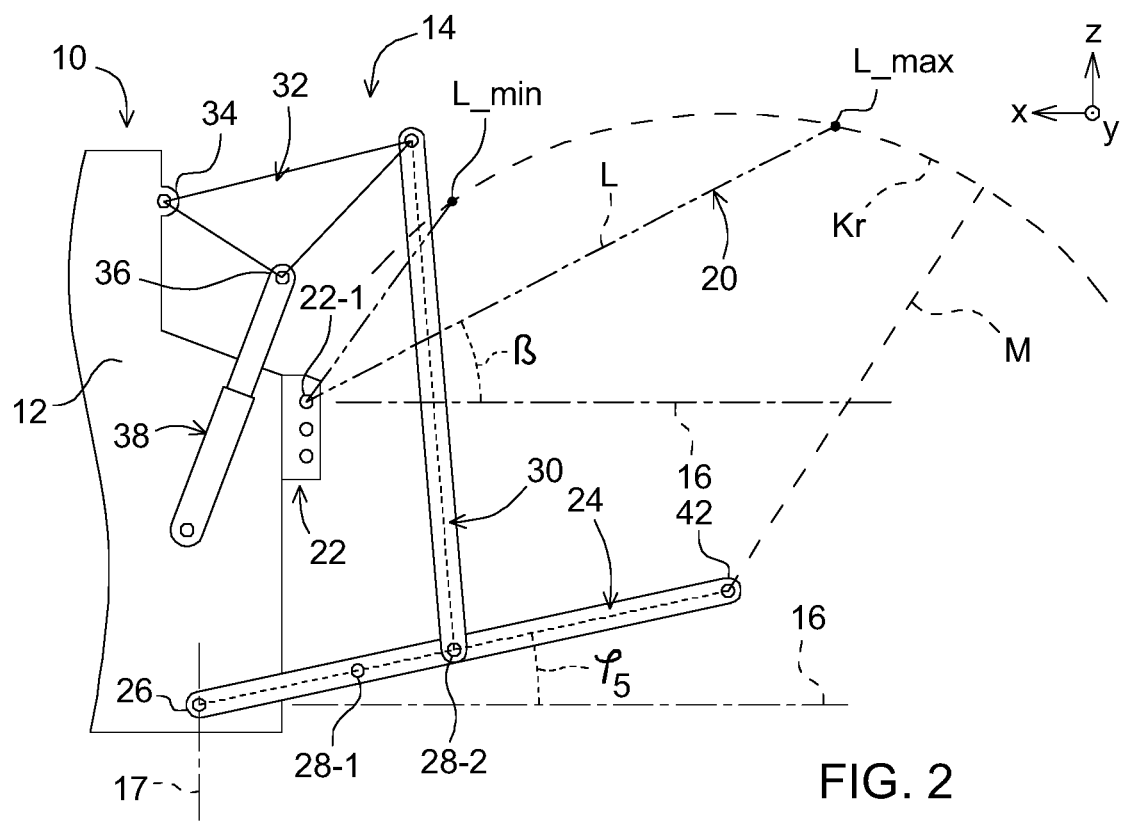
FIG. 2 is a side view of a three-point hitch according to FIG. 1 with the lower link in a different lifting position.

The three-point hitch 14 further includes two lower links 24 at a distance from one another in the y-direction or transverse direction of the vehicle 10. Each lower link 24 is articulated via a bearing 26 to the support structure 12. The lower link 24 includes two different articulation positions 28-1 and 28-2 for selective connection of a lifting strut 30. In the illustrated embodiment, the lifting strut 30 is connected at the articulation point 28-2. The lower link 24 is articulated via the lifting strut 30 to one end of a lifting arm 32, which is connected at its other end via a connection point 34 to the support structure 12 of the vehicle 10. The lifting arm 32 can be pivoted relative to the support structure 12 via a hydraulic cylinder 38, which engages with a lifting arm joint 36 and is supported against the support structure 12. With an appropriate actuation of the hydraulic cylinder 38, the lifting arm 32 is pivoted such that the pivoting movements thereof are transmitted via the lifting strut 30 to the lower link 24. In this manner, the lower link 24 is pivoted, for example, from a first lifting position at an angle $\varphi_1$ relative to the vehicle horizontal line 16 (FIG. 1) into a further lifting position at an angle $\varphi_5$ relative to the vehicle horizontal line 16 (FIG. 2). The length of the lifting strut 30 is constant. In another embodiment, the length of the lifting strut 30 is adjustable (e.g., as a lifting spindle) so that angular positions of the lifting arm 32 and the lower link 24 can be adjusted relative to one another.

The upper link 20 and the lower link 24 are connected via a coupling point 40 or a coupling point 42 to the implement 18. The upper link 20 is adjustable relative to the upper link length L thereof between a minimum length L_min and a maximum link L_max. For this purpose, the upper link 20 is designed, for example, as a hydraulic upper link having a piston-cylinder unit. At a constant lifting position, e.g., with the angle $\varphi_1$ or $\varphi_5$, of the lower link 24 and a constant mast height M between the coupling point 40 and the coupling point 42, the coupling point 40 is moved along a circular path Kr with the mast height M as the radius when the upper link length L is adjusted. An upper link angle β between the upper link 20 and the vehicle horizontal line 16 as the reference line is varied in this case.

According to the method, calibration data is provided for determining the upper link length L or the upper link angle β of the upper link 20 during working operation of the three-point hitch 14. According to FIG. 3, the calibration data is provided for the sake of example in the form of different characteristic curves K1, K2, K3, K4, K5. A different lower link angle φ is associated with each characteristic curve K. For example, the characteristic curve K1 is associated with the lower link angle $\varphi_1$, and the characteristic curve K2 is associated with the lower link angle $\varphi_2$, etc. The characteristic curves K are components of a diagram which presents a relationship between the upper link length L and the upper link angle β depending on different adjusted lifting positions of the lower link 24 (i.e., different lower link angles φ). Thereby a simple conversion between the upper link length L and the upper link angle β during the working operation is possible if the three-point hitch 14 is adjusted in a defined manner.

The upper link length L and the upper link angle β of the upper link 20 are to be determined in a cost-effective manner during working deployment, dispensing with typical sensor means on the vehicle 10 for detecting different physical parameters or features.

In one embodiment, suitable sensor means (e.g., inertial or inclination sensors) are provided on the upper link 20 in order to detect the upper link angle β. In this embodiment, the upper link angle β is detected by sensor means at an adjusted lifting position of the lower link 24 and the upper link length L is determined as a physical parameter. A cost-intensive and elaborate instrumentation or retrofitting on the vehicle 10 or the three-point hitch 14 for detecting the upper link length L can thus be avoided. In another embodiment, the upper link length L is first detected by sensor means in order to determine the upper link angle β as a physical parameter by means of the provided calibration data for an adjusted lifting position of the lower link 24. In this case, a detection of the upper link angle β by sensor means is superfluous.

Figure 3:
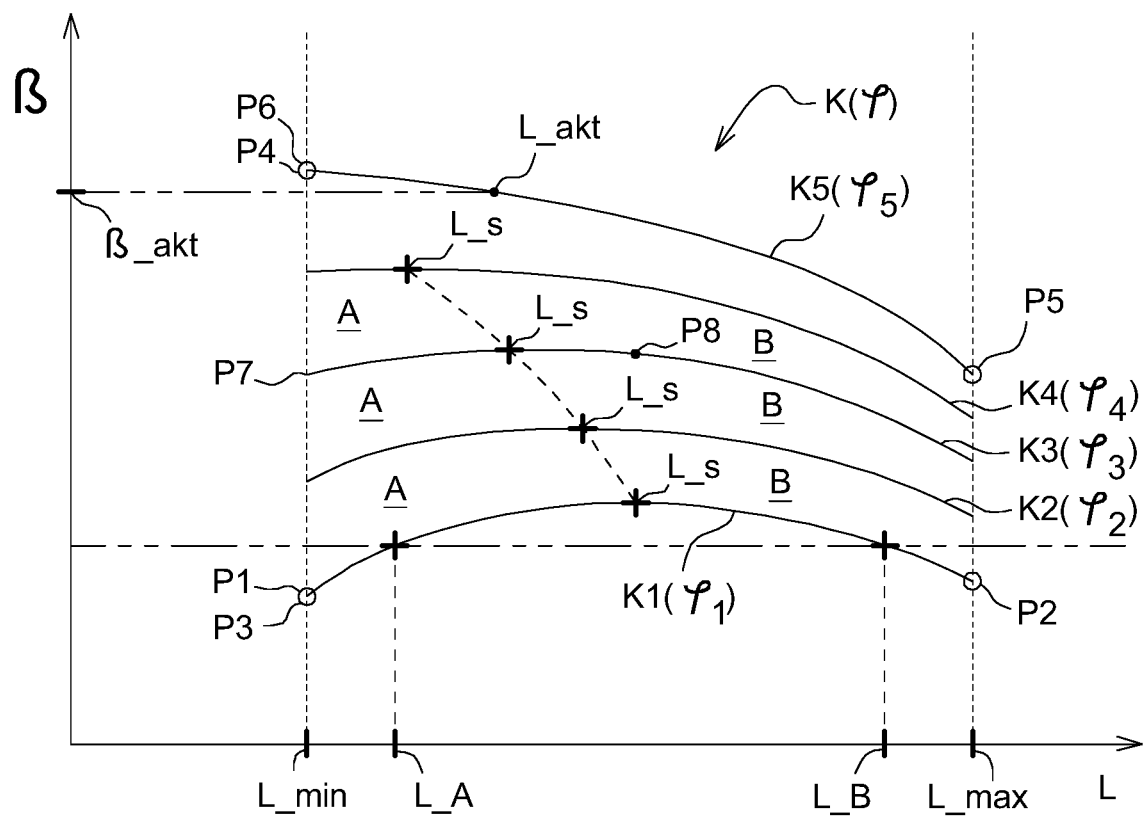
FIG. 3 is a diagram with calibration data as characteristic curves that represent an upper link angle in relation to an upper link length.

The calibration data is generated by means of a calibration process. In other words, the diagram according to FIG. 3 is calibrated for a specific geometry of the three-point hitch 14. The implement 18 is attached to the three-point hitch 14 to be calibrated. During the calibration, the lower link 24 is adjusted in at least two different lifting positions of the three-point hitch 14, e.g., in a first lifting position with the lower link angle $\varphi_1$ according to FIG. 1 and in a further lifting position with the lower link angle $\varphi_5$ according to FIG. 2. In each adjusted lifting position, the upper link 20 is moved or adjusted between the two end positions thereof, i.e., between the minimum upper link length L_min and the maximum upper link length L_max. The movement of the upper link 20 is presumed to be known, e.g., a continuous movement with constant adjusting speed or with a non-constant adjusting speed known by empirical tests. In order to compensate for any deviations from the presumed movement of the upper link 20, the upper link 20 is adjusted in both directions.

Beginning from the start of the calibration, a current upper link length L_akt can be recorded at every point in time without having to be measured. During the recorded variation of the upper link length L, the respective value of the current upper link angle β_akt is detected for each current upper link length L_akt, by means of sensor equipment, for example. From the value pairs of the current upper link length L_akt and the current upper link angle β_akt recorded at a defined lifting position of the lower link 24, a characteristic curve (e.g., characteristic curve K5) can be created and stored.

As already explained, the individual characteristic curves K each correspond to an adjusted lifting position or working position of the lower link 24, i.e., an adjusted lower link angle φ. Individual characteristic curves K are thus generated on the basis of a respective lifting position of the lower link 24. For the characteristic diagram according to FIG. 3, the characteristic curve K1 is first generated at a minimum lifting position of the lower link 24 and the characteristic curve K5 is generated at a maximum lifting position of the lower link 24. The three-point hitch 14 is initially adjusted for this purpose to the lifting position with the lower link angle $\varphi_1$. In addition, the upper link 20 is moved into the end position thereof with the minimum upper link length L_min. This is a starting position P1 for the calibration. Then the upper link 20 is extended to the maximal upper link length L_max (position P2) and then again retracted completely (position P3). As already explained, the upper link angle β is recorded during this displacement of the upper link 20. Thus, the characteristic curve K1 is generated and recorded. Subsequently the three-point hitch 14 is adjusted to the maximum lifting position of the lower link 24 with the lower link angle $\varphi_5$ (position P4). The upper link 20 is again completely extended (position P5) and then completely retracted (position P6). Thus, the characteristic curve K5 is also generated and recorded. Additional characteristic curves K lying between characteristic curves K1 and K5 (e.g., characteristic curves K2, K3, K4) can be generated analogously in order to produce the characteristic diagram according to FIG. 3. Alternatively, arbitrarily many characteristic curves between K1 and K5 can be generated by interpolation.

After generating the characteristic curves for specific lifting positions of the lower link 24, the calibration is complete. The three-point hitch 14 and the upper link 20 can now be adjusted to a working position in order to begin working operation. In this case, the three-point hitch 14 or the lower link 24 is lowered into a position P7, for example, and the upper link 20 is extended along with the upper link coupling point 40 into a position P8.

For the sake of completeness, it should be mentioned that the calibration or characteristic diagram explained according to FIG. 3 is applicable to a specific adjustment of the three-point hitch 14, and a corresponding different characteristic diagram must be generated for a different specific adjustment. These specific adjustments relate in particular to the adjusted connecting position at the connecting point 22, the adjusted length of the lifting strut 30, the adjusted articulation position 28 at the lower link 24 and any different possible coupling point 40, 42 on the implement 18, with correspondingly different mast heights M.

The lifting positions with the lower link angles $\varphi_1$ and $\varphi_5$ can be considered the lower and upper limits of a defined working range of the three-point hitch 14. In this disclosure, the determination of a physical parameter is suppressed outside this working range. In particular, a determination of the upper link length L is suppressed, whereas the upper link angle β continues to be detected and recorded in order to enable determination of the upper link length L again as soon as the three-point hitch 14 is again operating within the defined working range.

It can be seen from the diagram according to FIG. 3 that for certain lifting positions of the lower link 24, namely for characteristic curves K1 to K4, an upper link angle β determined by sensor means cannot unambiguously be associated with an upper link length L, so that the length thereof cannot be unambiguously determined directly. On the contrary, two different positions of the three-point hitch 14 are initially possible which is expressed, for example, by the two different values L_A and L_B for the upper link length L on either side of the inflection point L_s in characteristic curve K1. Therefore, a distinction of cases is carried out during working operation in order to determine whether the sought value of the upper link length L is in the range A to the left of the inflection point L_s or in the range B to the right of the inflection point L_s. To distinguish the cases, it is possible to record a variation over time of the upper link angle β and a displacement direction of the upper link 20 (from a greater length L to a smaller length L or vice versa). Taking into account the end positions L_min and L_max of the upper link 20, it is possible to decide whether the upper link length L of the upper link 20 is in the range A or in the range B.

The diagram or characteristic diagram according to FIG. 3 can alternatively be used proceeding from an upper link length L determined by sensor means in order to determine the upper link angle β. In contrast to a determination of the upper link length L, a distinction of cases is superfluous in this case, because the determination of the upper link angle β based on the detected upper link length L is unambiguous.

Figure 4:
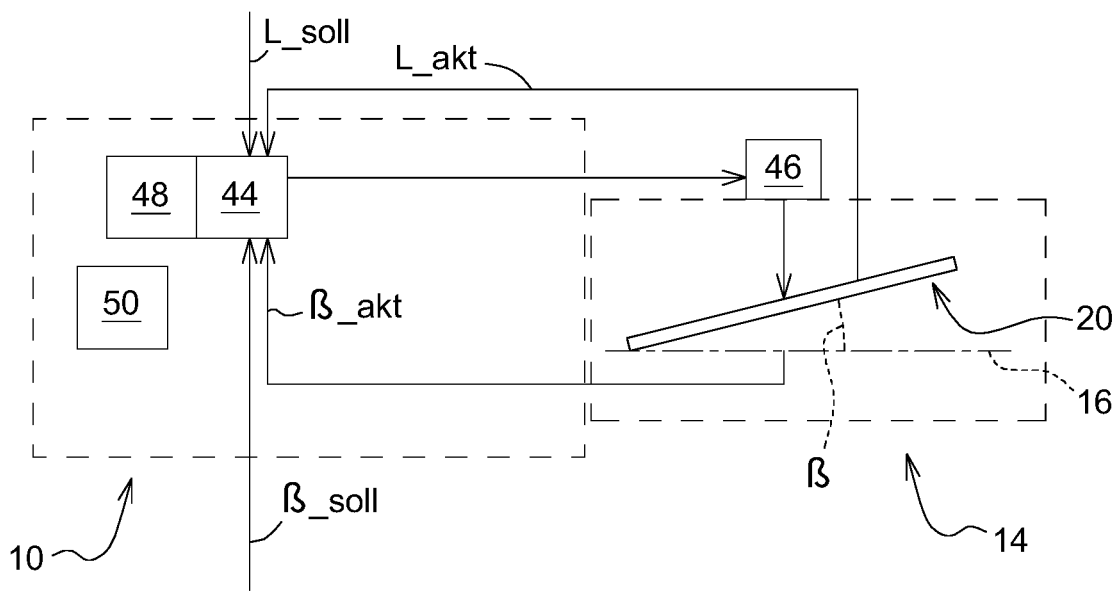
FIG. 4 is a block diagram with a schematically illustrated interaction of components for determining a physical parameter of an upper link.

In order to perform the method for determining a current upper link length L_akt or a current upper link angle β, at least one control device 44 for acquiring and processing sensor data is arranged on the vehicle 10 (FIG. 4). This control device 44 (or a further control device communicating therewith) is used for controlling the three-point hitch 14 for adjusting or changing the position thereof and for controlling a hydraulic control valve 46 actuating the upper link 20 to change the upper link length L. A memory unit 48 connected to the control device 44 is also provided in order to store the generated calibration data or characteristic curves K. An operating interface 50 on the vehicle 10 is used for starting the calibration process and for manually actuating the three-point hitch 14 and the upper link 20. By means of a characteristic curve K in the memory unit 48 and a current upper link angle β_akt detected by sensor means, the control device 44 can determine the associated current upper link length L_akt. Conversely, the control device 44 can also determine the current upper link angle β_akt associated with an upper link length L_akt detected by a sensor. The control device 44 in an embodiment is programmed such that the upper link 20 is controlled based on a specific input parameter. In particular, the control valve 46 is controlled by the control device 44 in such a manner that a target parameter in the form of a target upper link length L_soll or a target upper link angle β_soll is regulated. The current upper link length L_akt determined on the basis of the stored calibration characteristic diagram or the current upper link angle L_akt [sic; β_akt] determined by means of this calibration characteristic diagram is used as the feedback for the regulation.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for determining a physical parameter of an adjustable upper link of a three-point hitch during a working operation thereof, comprising:
    providing a lower link of the three-point hitch and an implement attachable to the upper and lower links of the three-point hitch;
    generating calibration data prior to the working operation of the three-point hitch, where the calibration data defines a relationship of a length of the upper link to an upper link angle defined between the upper link and a reference line;

using the calibration data to determine a physical parameter of the adjustable upper link during the working operation; and varying the upper link length between a minimum upper link length and a maximum upper link length in order to generate calibration data in a lifting position of the lower link with attached implement.

2. The method of claim 1, further comprising:

detecting a current angle of the upper link during the working operation; and determining the current upper link length of the upper link as the physical parameter.

3. The method of claim 1, further comprising:

detecting a current length of the upper link during the working operation; and determining a current upper link angle of the upper link as the physical parameter.

4. The method of claim 1, wherein the generating step comprises generating the calibration data based on an articulation position of the lower link for connecting a lifting strut.

5. The method of claim 1, wherein the generating step comprises generating the calibration data based on a connecting position on the supporting structure of the vehicle for connecting the upper link.

6. The method of claim 1, wherein the generating step comprises generating the calibration data based on an adjustable length of the lifting strut.

7. The method of claim 1, wherein the generating step comprises generating the calibration data based on a mast height of the implement.

8. The method of claim 1, wherein the generating step comprises generating the calibration data based on a lifting position of the lower link.

9. The method of claim 5, wherein the calibration data is generated for different lifting positions of the lower link.

10. The method of claim 1, further comprising:

defining a working range for the lower link delimited by a lifting position and a further lifting position; and suppressing the determination of the physical parameter of the upper link for a lifting position of the lower link outside the working range.

11. The method according to claim 1, wherein the varying step comprises:

varying the upper link length first in the direction of the minimum upper link length or of the maximum upper link length; and varying the upper link length thereafter in the opposite direction.

12. The method of claim 1, further comprising detecting the upper link angle during a length variation of the upper link.

13. The method of claim 1, wherein the calibration data is generated as a component of a characteristic curve.

14. The method of claim 1, further comprising determining the upper link length as a function of a change of the upper link angle over time.

15. The method of claim 1, further comprising determining the upper link length as a function of an adjusting direction of the upper link length.

16. A method for determining a physical parameter of an adjustable upper link of a three-point hitch during a working operation thereof, comprising:

providing a lower link of the three-point hitch and an implement attachable to the upper and lower links of the three-point hitch;

generating calibration data prior to the working operation of the three-point hitch, where the calibration data defines a relationship of a length of the upper link to an upper link angle defined between the upper link and a reference line; and using the calibration data to determine a physical parameter of the adjustable upper link during the working operation;

defining a working range for the lower link delimited by a lifting position and a further lifting position; and suppressing the determination of the physical parameter of the upper link for a lifting position of the lower link outside the working range.

17. A method for determining a physical parameter of an adjustable upper link of a three-point hitch during a working operation thereof, comprising:

providing a lower link of the three-point hitch and an implement attachable to the upper and lower links of the three-point hitch;

generating calibration data prior to the working operation of the three-point hitch, where the calibration data defines a relationship of a length of the upper link to an upper link angle defined between the upper link and a reference line;

using the calibration data to determine a physical parameter of the adjustable upper link during the working operation; and determining the upper link length as a function of a change of the upper link angle over time.

18. A method for determining a physical parameter of an adjustable upper link of a three-point hitch during a working operation thereof, comprising:

providing a lower link of the three-point hitch and an implement attachable to the upper and lower links of the three-point hitch;

generating calibration data prior to the working operation of the three-point hitch, where the calibration data defines a relationship of a length of the upper link to an upper link angle defined between the upper link and a reference line;

using the calibration data to determine a physical parameter of the adjustable upper link during the working operation; and determining the upper link length as a function of an adjusting direction of the upper link length.

\* \* \* \* \*